United States Patent
Shapiro et al.

(10) Patent No.: US 7,155,367 B1
(45) Date of Patent: Dec. 26, 2006

(54) METHOD FOR EVALUATING RELATIVE EFFICIENCY OF EQUIPMENT

(75) Inventors: Vadim Shapiro, Clive, IA (US); Ilya Markevich, West Des Moines, IA (US); Dmitriy Khots, West Des Moines, IA (US)

(73) Assignee: Continuous Control Solutions, Inc., Des Moines, IA (US)

( * ) Notice: Subject to any disclaimer, the term of this patent is extended or adjusted under 35 U.S.C. 154(b) by 9 days.

(21) Appl. No.: 11/042,783

(22) Filed: Jan. 25, 2005

(51) Int. Cl.
G06F 17/00 (2006.01)

(52) U.S. Cl. ............... 702/182; 702/179; 702/183; 703/6

(58) Field of Classification Search ........... 702/182, 702/113–115, 127, 138, 140, 179, 181, 187, 702/183–185, 188, 176–178; 417/6, 2, 42, 417/53, 44.1; 62/192, 175
See application file for complete search history.

(56) References Cited

U.S. PATENT DOCUMENTS

| | | | | |
|---|---|---|---|---|
| 5,321,621 A | * | 6/1994 | Sainen | ............... 700/140 |
| 5,537,519 A | | 7/1996 | Vossler et al. | ............... 345/420 |
| 5,743,714 A | * | 4/1998 | Drob | ............... 417/2 |
| 5,743,715 A | | 4/1998 | Staroselsky et al. | ........... 417/6 |
| 6,044,306 A | | 3/2000 | Shapiro et al. | ............... 700/90 |
| 6,116,258 A | | 9/2000 | Shapiro et al. | ............... 137/1 |
| 6,185,946 B1 | * | 2/2001 | Hartman | ............... 62/175 |
| 6,505,475 B1 | * | 1/2003 | Zugibe et al. | ............... 62/192 |
| 6,718,291 B1 | | 4/2004 | Shapiro et al. | ............... 707/2 |
| 6,847,854 B1 | * | 1/2005 | Discenzo | ............... 700/99 |
| 6,860,103 B1 | * | 3/2005 | Raghvachari | ............... 60/410 |
| 6,973,410 B1 | * | 12/2005 | Seigel | ............... 702/182 |
| 2004/0081549 A1 | | 4/2004 | Sahpiro et al. | ............... 415/1 |

* cited by examiner

*Primary Examiner*—Hal Wachsman
(74) *Attorney, Agent, or Firm*—McKee, Voorhees & Sease, P.L.C.

(57) ABSTRACT

The current invention is a computer implemented method of evaluating relative efficiency of equipment by constructing a mathematical model of the operation of the equipment, calculating a distance between an actual operating point and the mathematically obtained optimal operating point of the equipment, and processing the distances to identify efficiency changes of the equipment.

16 Claims, 3 Drawing Sheets

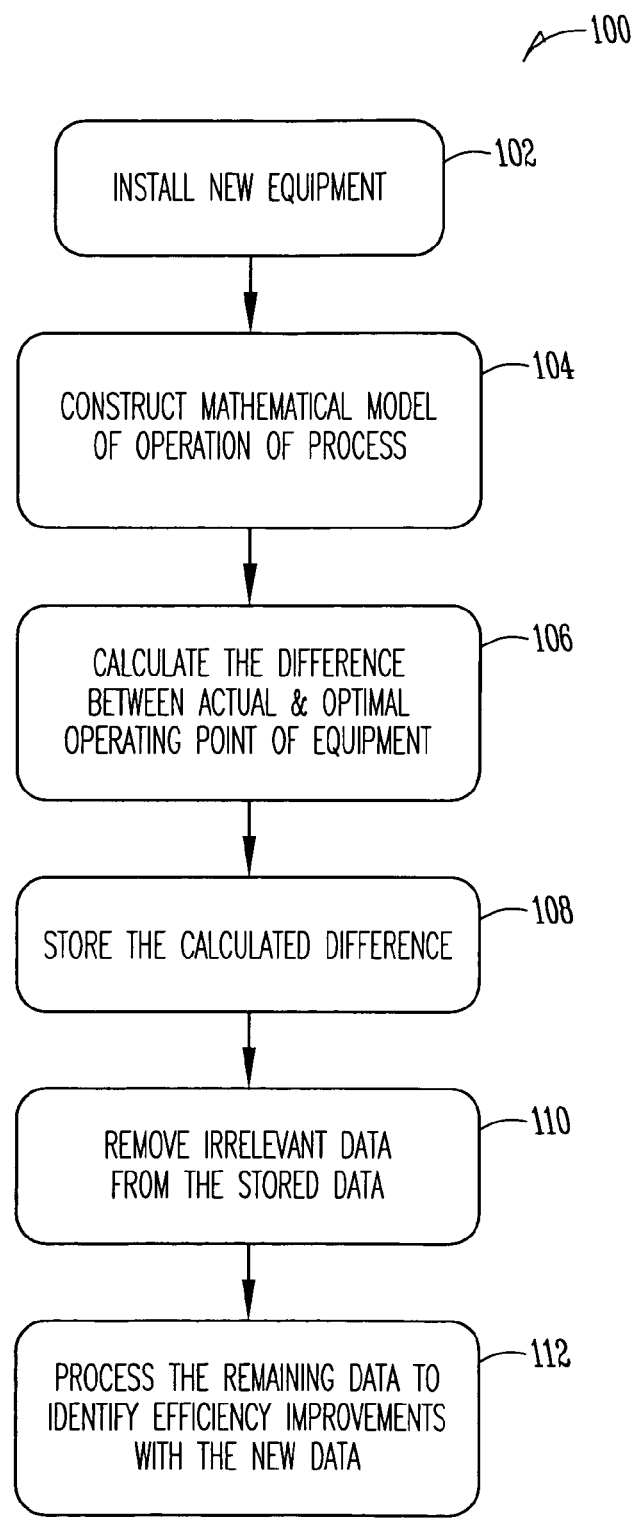

US 7,155,367 B1

METHOD FOR EVALUATING RELATIVE EFFICIENCY OF EQUIPMENT

BACKGROUND OF THE INVENTION

The present invention relates to a method for correctly calculating the efficiency of implementation of new equipment in a process-type controlled factory in order to determine the improvement of the production efficiency. Specifically, the present invention provides an index to make possible the evaluation of the efficiency of implementation of new equipment in a factory and provides a method for calculating that index.

In manufacturing work in a process-type factory, such as a chemical plant or an oil refining plant, it is mostly the case that there are a plurality of conditions and source materials which affect equipment. This is particularly true in compressor control systems. Therefore, it is difficult to compare the production efficiency of the equipment at period of time with production efficiency at another period of time, because of the changing ambient conditions and the source of materials variations.

As more companies become concerned with the determination of their investment project's efficiency, it becomes necessary to have a tool to identify and quantify efficiency improvements after implementation of a new project. It is difficult to accurately compare changes of efficiencies in the same plant between different period of time (before project implementation and after implementation) that continuous conditions and source materials variations. Therefore, it is desirable to have a system which can accurately calculate and determine the efficiency improvement before and after installation of new equipment in the factory.

The primary object of the present invention is to provide an improved method for evaluating relative efficiency of equipment.

Another object of the present invention is to allow for determining efficiency of operating equipment regardless of ambient conditions and source materials variations.

One or more of these or other objects of the invention will be apparent from the specification and claims that follow.

SUMMARY OF THE INVENTION

The foregoing objects may be achieved by a method to evaluate relative efficiency of equipment comprising the steps of constructing a mathematical model, calculating a difference between an actual operating point and an optimal operating point of the equipment, storing a plurality of the calculated data, and processing the data to identify efficiency improvements.

A further feature of the present invention involves a method for evaluating relative efficiency of equipment wherein calculation of distance between the actual operating point and the optimal operating point takes into consideration conditions external to the equipment.

A further feature of the present invention involves a method for evaluating relative efficiency of equipment wherein data from irrelevant time intervals is removed from stored data.

A further feature of the present invention involves a method for evaluating relative efficiency of equipment wherein the normal distribution of the data is calculated.

A further feature of the present invention involves a method for evaluating relative efficiency of equipment wherein the most efficient equipment is determined by whichever equipment's mean value actual operating point is closer to the optimal operating point.

A further feature of the present invention involves a method for evaluating relative efficiency of equipment wherein the equipment to be evaluated is process-type equipment.

The foregoing objects may also be achieved by a computer assisted method for quantifying an improved efficiency of a manufacturing process after implementation of an efficiency improving project, comprising modeling the manufacturing process, calculating the distance between current operating point and optimal operating point of the equipment to be evaluated, storing a plurality of the calculated data, and processing a plurality of the calculated data to identify efficiency improvements in the equipment.

A further feature of the present invention involves a computer assisted method for quantifying an improved efficiency of a manufacturing process after implementation of an efficiency improving project wherein the calculation of distance between the actual operating point and the optimal operating point takes into consideration conditions external to the equipment.

A further feature of the present invention involves a computer assisted method for quantifying an improved efficiency of a manufacturing process after implementation of an efficiency improving project wherein data from irrelevant time intervals is removed from the stored data.

A further feature of the present invention involves a computer assisted method for quantifying an improved efficiency of a manufacturing process after implementation of an efficiency improving project wherein the normal distribution of the data is calculated.

A further feature of the present invention involves a computer assisted method for quantifying an improved efficiency of a manufacturing process after implementation of an efficiency improving project wherein the most efficient equipment is determined by whichever equipment's mean value actual operating point is closer to the optimal operating point.

A further feature of the present invention involves a computer assisted method for quantifying an improved efficiency of a manufacturing process after implementation of an efficiency improving project wherein the equipment to be evaluated is process-type equipment.

The foregoing objects may also be achieved by a method of comparing efficiencies of equipment A versus equipment B in a process without assuming continuous conditions and allowing for material variations in the equipment, comprising obtaining time series operational data for a distance between an optimal operational value and actual operational value for equipment B, computing a mean value for a first system using equipment A in a second mean value for a second system using equipment B, and computing an efficiency improvement based on the differences between the first mean value and the second mean value.

A further feature of the present invention involves a method of comparing efficiencies of equipment A versus equipment B in a process wherein the process is a manufacturing process.

A further feature of the present invention involves a method of comparing efficiencies of equipment A versus equipment B in a process wherein the time series data is calculated on a computer.

A further feature of the present invention involves a method of comparing efficiencies of equipment A versus equipment B in a process wherein the calculation of distance between the actual operating point and the optimal operating point takes into consideration conditions external to the equipment.

A further feature of the present invention involves a method of comparing efficiencies of equipment A versus equipment B in a process wherein data from irrelevant time intervals is removed from the store data.

A further feature of the present invention involves a method of comparing efficiencies of equipment A versus equipment B in a process wherein the normal distribution of the data is calculated.

A further feature of the present invention involves a method of comparing efficiencies of equipment A versus equipment B in a process wherein the most efficient equipment is determined by whichever equipment's mean value actual operating point is closer to the optimal operating point.

A further feature of the present invention involves a method of comparing efficiencies of equipment A versus equipment B in a process wherein the equipment to be evaluated is process-type equipment.

These and other features will become apparent to one skilled in the art.

BRIEF DESCRIPTION OF THE DRAWINGS

FIG. 5 shows an exemplary flow chart of one embodiment of the present invention.

DETAILED DESCRIPTION OF THE PREFERRED EMBODIMENT

The present invention relates to an index to make possible the evaluation of the efficiency of implementation of new equipment in a factory and provide a method for calculating that index. The method for calculating the relative equipment efficiency comparing original equipment and the newly installed equipment according to the present invention comprises: (1) static and dynamic mathematical model construction, (2) calculating the distance between the current operating point of the equipment and the model considered to be optimal operating point, (3) storing a plurality of operational data obtained from calculation of the distance between the current operating point and the model considered to be optimal operating point of the equipment, and (4) processing the plurality of operational data to identify efficiency improvements of the new equipment over the prior equipment.

To begin the process of determining relative production efficiency for evaluating changes of efficiencies in the same plant before and after new equipment implementation, we must construct a mathematical model simulating the operation of both the new equipment and the previous equipment. Building a mathematical model to simulate both the new equipment and the previously installed equipment is common in the art. In the present invention it is preferred, but not required that one or more of the following commonly known algorithms is used to develop the mathematical model representing the operation of the equipment: topological-algebraic infinite-dimensional methods, clustering algorithms, self-organized map (SOM) algorithms, expectation maximization (EM) algorithms, genetic algorithms (GA), maximum likelihood training of hidden Markov model (MLTHMM) algorithms, neural networks, linear and non-linear correlation and regression algorithms, factor analysis (FA) algorithms, and real-time computation of time-recursive discrete sinusoidal transforms (DST) algorithms.

It is noted that the list of algorithms above mentions the estimator types for mathematically calculating the operation of the equipment. It should be noted that all the mentioned classes of algorithms have their own parameters, coefficients, forms, etc. Every equipment system is unique and therefore using the correct algorithm will play a major role in the accuracy of the mathematical estimation. For example, the regression algorithm will have minimum and maximum powers for polynomials as parameters.

Figure 1:
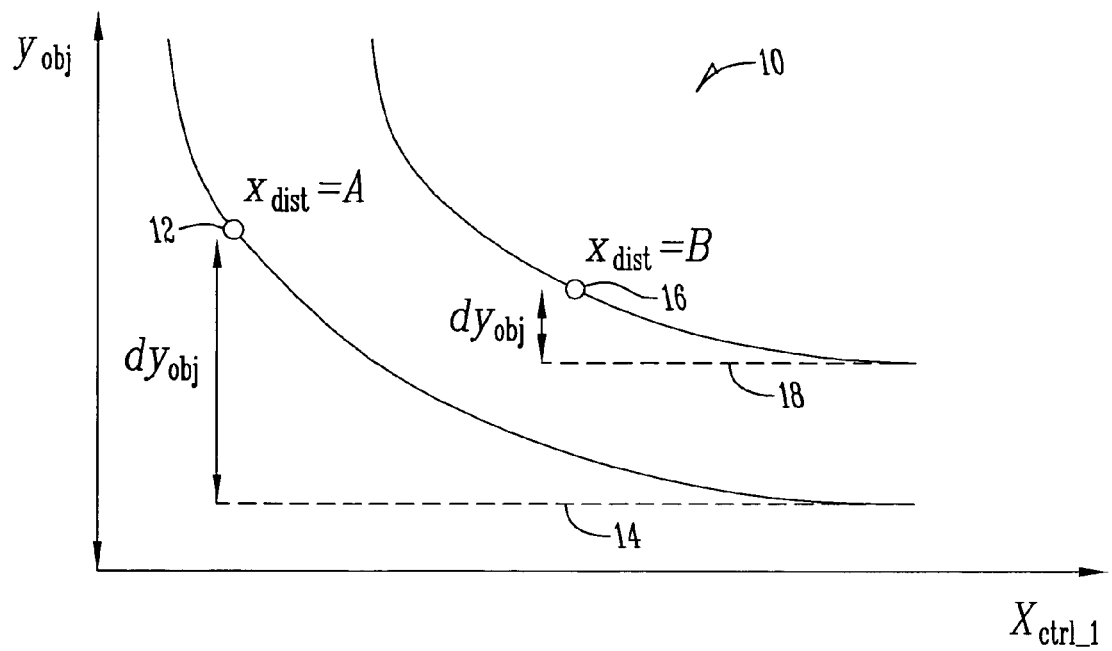
FIG. 1 shows a two-dimensional minimization example of an optimal operating point for a mathematical model.

The second step in the method for evaluating relative efficiency of equipment is to calculate the distance between a current operating point of the equipment and the model considered to be the optimal value operating point of the equipment. To do this, we first let $[T_0,T_1]$ be the time interval where the efficiency comparison needs to be carried out. The optimization package outputs the following information: $y_{obj}$—the variable being optimized as a function of control variables $(x_{ctrl\_1}, \ldots x_{ctrl\_n})$ given external conditions $x_{dist}$. Then, for some $x_{dist}$, we fix a point on the graph of $y_{obj} = f(x_{ctrl\_1}, \ldots x_{ctrl\_n})$ and measure the distance between the current point and the optimal value of $y_{obj}$. Call this distance $dy_{obj}$. FIG. 1 gives a two-dimensional minimization example 10.

The calculated operating point for equipment A or the prior equipment is shown as 12. What is calculated as the optimal operating point for equipment A is shown as 14. Similarly, the operating point for equipment B is shown as 16. From this, we can then calculate $dy_{obj}$ as shown in FIG. 1.

Once we have calculated the distance between the current operating point of the equipment and the model considered optimal value of the equipment we then need to store a plurality of operational data which was obtained from the calculation of distance between the current operating point and the point considered optimal value of the equipment.

Since we have this information as calculated for any time instance $t_i \epsilon [T_0, T_1]$, in fact we have $dy_{obj}(t_i)$. These values are the main input for the algorithm. Thus we have a time series $dy_{obj}$ vs. time $[T_0,T_1]$ as illustrated in the FIG. 2.

Figure 2:
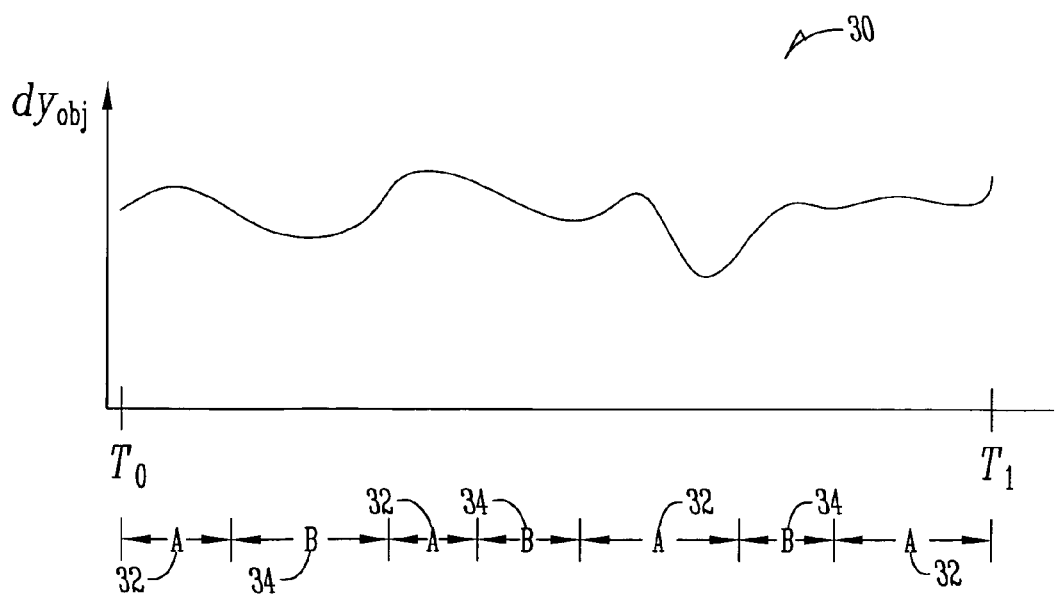
FIG. 2 shows a time series of $DY_{obj}$ vs. time $[T_0,T_1]$.

FIG. 2 shows the time series $DY_{obj}$ vs. time $[T_0,T_1]$ 30. The time when control system A or equipment A worked is shown as 32. The time in control system B or equipment B worked is shown as 34.

The time interval $[T_0,T_1]$ is split according to whether control system A or B worked with irrelevant intervals removed (these are the so called "dead zones", which are relatively small periods of time during which only one system is online, and before and after which the other system is online. In particular, for the identification of new system efficiency, we would also not include those time intervals during which the system was notified of either a new unit startup or an existing unit shutdown). We then can symbolically rewrite $[T_0, T_1] = A \cup B$.

Once we have removed irrelevant data and stored the data, it is time to process the data to identify efficiency improvements.

To process the stored data to identify efficiency improvements, we next separate the $dy_{obj}$ values according to the working control system and compute their distributions (assuming that they are Gaussian). To do this, first compute $$\mu_A = \frac{\sum_{t_i \in A} dy_{obj}(t_i)}{|A|} \text{ and } \mu_B = \frac{\sum_{t_i \in B} dy_{obj}(t_i)}{|B|}.$$

Second, compute $$\sigma_A = \sqrt{\frac{\sum_{t_i \in A}(dy_{obj}(t_i) - \mu_A)^2}{|A| - 1}} \text{ and } \sigma_B = \sqrt{\frac{\sum_{t_i \in B}(dy_{obj}(t_i) - \mu_B)^2}{|B| - 1}}.$$

Now, we have the normal distributions for both systems, given to us by $$P_A(dy_{obj}) = \frac{1}{\sigma_A \cdot \sqrt{2\pi}} \exp\left(-\frac{(dy_{obj} - \mu_A)^2}{2 \cdot \sigma_A^2}\right) \text{ and } P_B(dy_{obj}) =$$

$$\frac{1}{\sigma_B \cdot \sqrt{2\pi}} \exp\left(-\frac{(dy_{obj} - \mu_B)^2}{2 \cdot \sigma_B^2}\right).$$

The efficiency win of one system over another is the difference $\mu_A$ and $\mu_B$. That is, whichever system's mean value is closer to zero (the optimum), that system is more effective (on average), as illustrated in FIG. 3.

Figure 3:
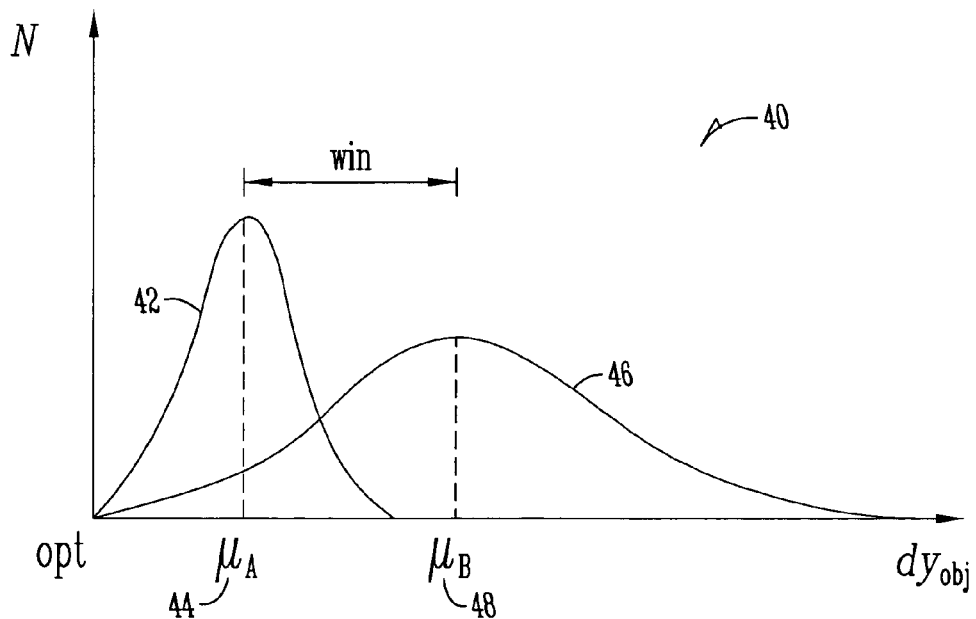
FIG. 3 shows an exemplary normal distribution for two equipment systems.

The normal distributions for both systems A and B are shown as 40 in FIG. 3. System A normal distribution is shown as 42. The difference between system A normal distribution and optimal is shown as 44. Similarly, system B normal distribution is shown as 46 and the difference between system B normal distribution and optimal is shown as 48.

Furthermore, after these distributions have been built, we can tell (irregardless of the ambient conditions) which system is performing better by looking at the current value $dy_{obj}(t_{current})$ and comparing it with the mean of the other system.

Figure 4:
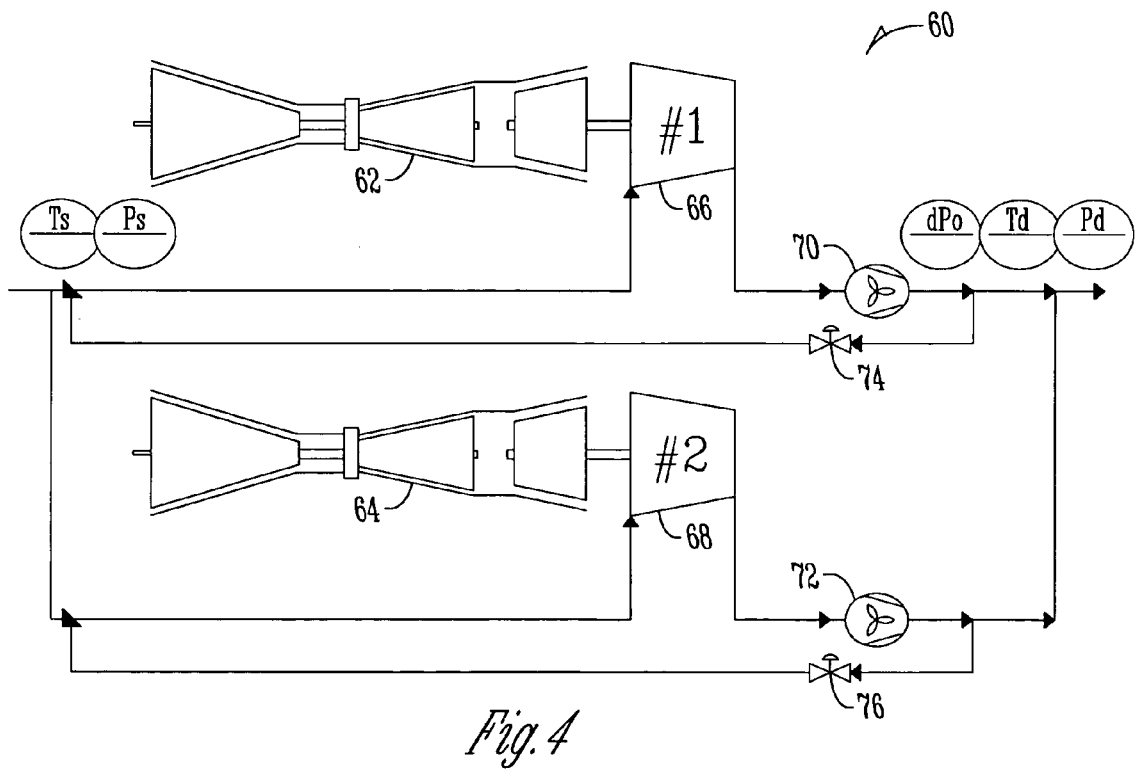
FIG. 4 shows an example gas pumping pipeline station where the efficiency of system 1 can be compared with the efficiency of system 2 using the current invention.

FIG. 4 shows one example of a gas pumping pipeline station 60 which is a multi-compressor load sharing application for use in calculating the relative efficiency of equipment A and equipment B. The station has two gas turbine driven gas compressors operating in parallel mode. Turbine A and B are shown in 62 and 64 respectively. Compressor A and B is shown in 66 and 68 respectively. Additionally, header A and header B are shown in 70 and 72 respectively. Finally, fuel control valve A and fuel control valve B are shown in 74 and 76 respectively.

The main operational objective is maintaining gas flow rate in accordance to dispatcher's set point.

Station Control system calculates each gas turbine fuel controller set point (NPT SP—compressor's speed) to satisfy main operational objective—provide required stations flow rate. These NPT SPs are passed to each Unit's fuel controller. NPT SPs allow Station Control System to maintain flow in a header by indirectly manipulating compressors performance. The overall results is that the Station Control System can indirectly manipulate fuel control valves of each unit in a manner that main operational objective is contented. It is obvious, that numerous different combinations of unit's speeds can provide required station flow rate. However, each unit has different fuel consumption characteristic and different combinations of unit's speeds represent different total fuel consumption, or different process efficiency. The purpose of any control optimization system is minimizing total fuel consumption over compressor stations ($y_{obj}$). The present invention quantifies the efficiency of current operating decision of Control System by measuring the distance between the current operating point and the optimal value of $y_{obj}$. As a first step, the system collects raw data and converts it into a static model. The system analyzes responses of one continuous variable as a function of one or more continuous independent variables. The objective function of the problem is a sum of the fuel over all units in the network. Present method provides following equation for each unit:

Fuel i=f (Ps i, P d i, T1 i, Td i, Ts i, NPT i)

Where

Pd i—i Unit Discharge Pressure.

Ps i—i Unit Suction Pressure.

Td i—i Unit Discharge Temperature.

Ts i—i Unit Suction Temperature.

T1 i—Axial Compressor inlet temperature;

NPT i—i Power turbine speed.

The input for the algorithm is the function that needs to be optimized and constraints that are represented by a collection of functions that the solution needs to respect. The optimum point will occur where the partial derivatives of the integrated objective function are zero. The optimal value of the objective function is stored along with the specific values of the other variables.

Test of optimization functions of load sharing was performed on two 25 Mwt gas turbine driven pipeline compressors. Station Control System A set the NPT set points 4850 rpm for each speed regulator (case A). Total fuel consumption was 8450 kg/hr. Station Control System B changed NPT set point for first unit to 4800 rpm and 4900 rpm (case B) and by the end of transition NPT of unit #1 exceeded NPT of unit #2 by 100 rpm and the same flow rate was maintained in a header. At the same time the change of total specific consumption of fuel gas was registered. During steady process Station Control System decision reduced total specific consumption of fuel gas to 8310 kg/hr or by 140 kg/hour by means of load sharing between two running units. According to system computation the optimal value of the total fuel consumption function under current operating conditions is 8300 kg/hr. So, the distance between operating point and the model considered optimal value is 150 kg/hr in case A; and 10 kg/hr in case B. Station Control System B decision is 140 kg/hr more efficient based on 20 min test results. If system continues storing a plurality of operational data obtained from calculation of distance between the current operating point and the model considered optimal value for long period of time it would be able to calculate how much Station Control System B is more efficient then Station Control System A in average.

The basic steps of one embodiment of the current invention are exemplified by the flow chart of method comparing efficiency of equipment 100 depicted in FIG. 5. The first step in evaluating relative efficiency of equipment is shown in number 102 by installing new equipment which can be compared with existing equipment. As discussed earlier, this equipment is preferred to be process type equipment in a factory. However, it can be any other equipment which an efficiency can be calculated for its operation. Once the equipment is installed we must construct a mathematical model shown in 104 of the operation of the new equipment and the existing equipment. The mathematical model that we construct can be computed in many different ways using many different algorithms. When we construct a mathematical model of the operation of the new and existing equipment it is important to calculate both the actual and the optimal value for the operation of the equipment. Once the mathematical model is calculated we have to then determine the difference between the actual operating point of the equipment and the optimal operating point of the equipment shown in 106. Once the calculated difference between the actual and optimal operating points of equipment is completed 106, we then store a calculated difference 108. From the stored data 108 we remove any irrelevant data from the stored data 110. The data that is removed from the stored data is data from the so called "dead zones", which are relatively small periods of time during which only one system is on line, and before and after which the other system is on line. The final step for evaluating relative efficiency of equipment is to process the remaining data which is stored to identify the efficiency improvements with the new data 112. Once again, this is done by taking the normal distributions of both systems as shown above.

It is preferred that the current invention be practiced with the use and aid of a computer. The computer and computer program for practicing the current invention are responsible for calculating and storing the data used in the current invention.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

The invention claimed is:

1. A computer implemented method for evaluating relative efficiency of equipment comprising the steps of:
   constructing a model of operation for the equipment using a computer wherein an optimal operating point is calculated;
   measuring a plurality of actual operating points of the equipment at discrete times;
   calculating a distance between each actual operating point and the optimal operating point wherein each distance is stored as a discrete data point in a computer memory;
   analyzing the discrete data points to determine a mean distance value; and
   providing an output indicative to a user of the relative efficiency of the equipment where the mean distance value equals the relative efficiency of the equipment.

2. The computer implemented method for evaluating relative efficiency of the equipment of claim 1, wherein the model is constructed from an algorithm selected from the group consisting of:
   topological-algebraic infinite-dimensional methods;
   clustering algorithms;
   self-organized map (SOM) algorithms;
   expectation-maximization (EM) algorithms, genetic algorithms (GA);
   maximum likelihood training of hidden Markov model (MLTHMM) algorithms;
   neural networks;
   linear and nonlinear correlation and regression algorithms;
   factor analysis (FA) algorithms; and
   real-time computation of time-recursive discrete sinusoidal transforms (DST) algorithms.

3. The computer implemented method for evaluating relative efficiency of the equipment of claim 1, wherein the calculation of the distance between the actual operating point and the optimal operating point takes into consideration quantifiable conditions external to the equipment.

4. The computer implemented method for evaluating relative efficiency of the equipment of claim 1, wherein data from irrelevant time intervals is removed from the stored discrete data points.

5. The computer implemented method for evaluating relative efficiency of the equipment of claim 1, wherein the distribution of the discrete data points is normalized.

6. The computer implemented method for evaluating relative efficiency of the equipment of claim 1, wherein the equipment to be evaluated is process-type equipment.

7. A computer implemented method for evaluating relative efficiency of equipment A versus equipment B comprising the steps of:
   constructing a model of operation for equipment A utilizing a computer wherein an optimal operating point is calculated;
   measuring a plurality of actual operating points of equipment A at discrete times;
   calculating a distance between each actual operating point of equipment A and the optimal operating point of equipment A wherein each distance is stored as a discrete data point in a memory of the computer;
   analyzing the discrete data points of equipment A to determine a mean distance value for equipment A wherein the mean distance value is stored in the computer memory;
   constructing a model of operation for equipment B utilizing the computer wherein an optimal operating point is calculated;
   measuring a plurality of actual operating points of equipment B at discrete times;
   calculating the distance between each actual operating point of equipment B and the optimal operating point wherein each distance is stored as a discrete data point in the computer memory;
   analyzing the discrete data points of equipment B to determine a mean distance value for equipment B wherein the mean distance value is stored in the computer memory;
   comparing the mean difference value of equipment A to the mean distance value of equipment B; and
   calculating and outputting a difference in mean distance values between equipment A and equipment B indicative to a user of relative efficiency of the equipment.

8. The computer implemented method for evaluating relative efficiency of equipment A versus equipment B of claim 7 wherein equipment B is essentially the same as equipment A.

9. The computer implemented method for evaluating relative efficiency of equipment A versus equipment B of claim 8 wherein only a single mathematical model is constructed.

10. The computer implemented method for evaluating relative efficiency of equipment A versus equipment B of claim 8, wherein the equipment A and equipment B are used in a manufacturing process.

11. The computer implemented method for evaluating relative efficiency of equipment A versus equipment B of claim 7, wherein the model used is an algorithm from the group consisting of:
   topological-algebraic infinite-dimensional methods;
   clustering algorithms;

self-organized map (SOM) algorithms;
expectation-maximization (EM) algorithms, genetic algorithms (GA);
maximum likelihood training of hidden Markov model (MLTHMM) algorithms;
neural networks;
linear and nonlinear correlation and regression algorithms;
factor analysis (FA) algorithms; and
real-time computation of time-recursive discrete sinusoidal transforms (DST) algorithms.

12. The computer implemented method for evaluating relative efficiency of equipment A versus equipment B of claim 7, wherein the calculation of distance between the actual operating point and the optimal operating point for each of equipment A and equipment B takes into consideration quantifiable conditions external to the equipment.

13. The computer implemented method for evaluating relative efficiency of equipment A versus equipment B of claim 7, wherein data from irrelevant time intervals is removed from the stored discrete data points.

14. The computer implemented method for evaluating relative efficiency of equipment A versus equipment B of claim 7, wherein the normal distribution of the discrete data points is calculated.

15. The computer implemented method for evaluating relative efficiency of equipment A versus equipment B of claim 7, wherein the more efficient equipment is determined by whichever equipment's mean distance value is closer to the optimal operating point.

16. The computer implemented method for evaluating relative efficiency of equipment A versus equipment B of claim 7, wherein the equipment to be evaluated is process-type equipment.

* * * * *